United States Patent [19]
Gough

[11] Patent Number: 5,105,933
[45] Date of Patent: Apr. 21, 1992

[54] DISC/CAM TYPE TIPPING MECHANISM FOR BUCKET CONVEYOR

[75] Inventor: George T. Gough, Staffordshire, United Kingdom

[73] Assignee: Refac International Limited, West Palm Beach, Fla.

[21] Appl. No.: 746,135

[22] Filed: Aug. 13, 1991

Related U.S. Application Data

[63] Continuation of Ser. No. 336,186, Apr. 11, 1989, abandoned.

[30] Foreign Application Priority Data

Apr. 13, 1988 [GB] United Kingdom ............... 8808745

[51] Int. Cl.⁵ ............................................. B65G 47/40
[52] U.S. Cl. ..................................... 198/706; 198/712
[58] Field of Search ...................... 198/706, 712, 713

[56] References Cited

U.S. PATENT DOCUMENTS

| | | | |
|---|---|---|---|
| 1,048,834 | 12/1912 | Hunt. | |
| 1,636,220 | 7/1927 | Eddington | 198/706 |
| 3,055,486 | 9/1962 | Meyer | 198/706 |
| 3,381,796 | 5/1968 | Gregor | 198/706 |
| 3,403,444 | 10/1968 | Chollet | 198/706 X |
| 3,944,056 | 3/1976 | Feehery, Jr. | 198/706 X |
| 4,171,739 | 10/1979 | Yamato | 198/704 |
| 4,366,628 | 1/1983 | George | 198/706 X |
| 4,493,413 | 1/1985 | Harrell | 198/706 X |
| 4,607,745 | 8/1986 | Wiese | 198/706 |
| 4,722,433 | 2/1988 | Gough | 198/706 |
| 4,770,287 | 9/1988 | Glowatzki | 198/706 |

FOREIGN PATENT DOCUMENTS

| | | | |
|---|---|---|---|
| 0154277 | 4/1951 | Australia | 198/706 |
| 0212858 | 7/1986 | European Pat. Off. . | |
| 0095017 | 6/1983 | Japan | 198/706 |
| 0216806 | 12/1983 | Japan | 198/706 |
| 0686772 | 1/1953 | United Kingdom | 198/706 |

Primary Examiner—D. Glenn Dayoan
Attorney, Agent, or Firm—W. Thad Adams, III

[57] ABSTRACT

A tipping mechanism for buckets carried by a conveyor or elevator. Each bucket 28 is attached to a chain 26 by a swing link 29 and each bucket carries a sector shape cam 30. As the buckets are carried around a sprocket 27 the cam 30 contacts a peg 31, so as to cause the bucket to progressively tip and empty. The movement of the buckets back to their horizontal position is fully controlled and is smooth by virtue of the contact between a French curve on the cam 30 and a cam surface 35 of substantially wedge shape located above or below the conveyor or elevator chain.

8 Claims, 4 Drawing Sheets

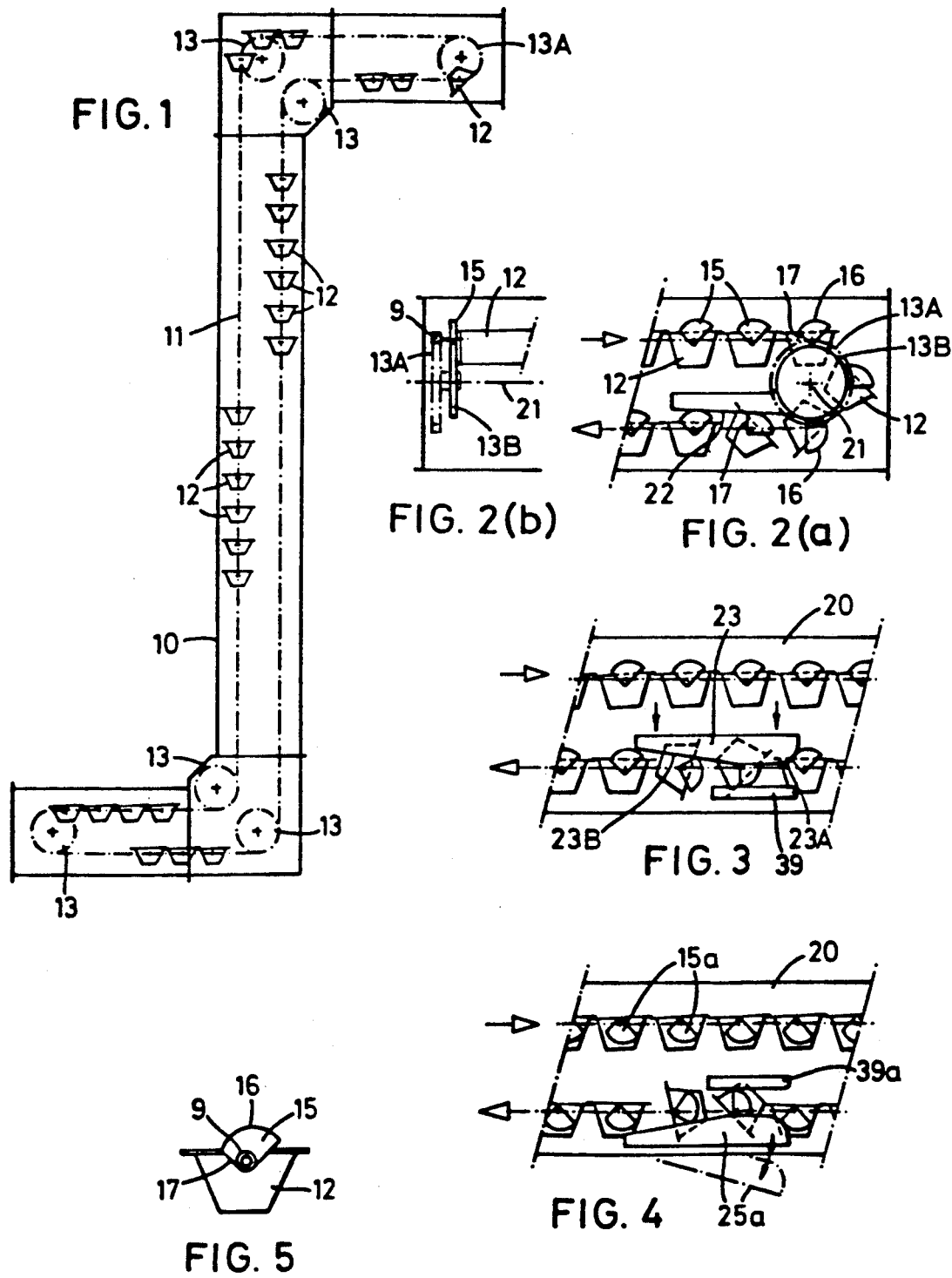

DISC/CAM TYPE TIPPING MECHANISM FOR BUCKET CONVEYOR

This application is a continuation application of U.S. Serial No. 336,186, filed Apr. 11, 1989, now abandoned.

TECHNICAL FIELD AND BACKGROUND OF INVENTION

This invention relates to a tipping mechanism for bucket conveyors or elevators, particularly of the type which are used to transfer bulk materials from one level to another.

The invention is applicable to many types of bucket elevators and conveyors but may, for instance, be applied to the bucket conveyor described in European Patent Application 0212858A or in U.S. Pat. No. 4722433.

SUMMARY OF INVENTION

An object of the present invention is to provide an elevator which can operate at high speeds and discharge its buckets at those high speeds and this is achieved by controlling the swinging or pivoting of the buckets after dumping or tipping of the load.

According to the present invention there is a tipping mechanism for a bucket elevator or conveyor which comprises a cam attached to each bucket and a first cam following surface adjacent the bucket elevator, or on a sprocket which drives the elevator, the cam on each bucket being shaped and arranged in relation to the cam surfaces adjacent the elevator or on the sprocket so that the bucket is initially tipped and then, optionally, is made to dwell in its tipped position for a time after which a progressive radius on the cam on the bucket contacts a second cam follower surface which causes the bucket to return to its non-tipped position in a smooth and progressive manner without spinning or being liable to collide with an adjacent bucket.

Preferably this is achieved by the cam on each bucket having a straight section which effects the tipping action followed by a "French curve" i.e. a curve of gradually increasing radius. The cam may for instance be generally in the shape of a sector of a circle with the curved part in the form of said French curve.

The cam is preferably arranged so that initially the apex and then a straight portion of the sector shaped cam will contact a first cam follower surface causing the bucket to tip to its discharge position and then the curved portion of the cam will contact a second portion of the cam follower surface or another cam follower surface to cause the bucket to gradually return in a stable manner to its non-tip position. The cam follower surfaces to be engaged by the cam on each bucket may be above or below the buckets, or may be located on a sprocket. The cam follower surface may also be movable into and out of the path of the buckets so as to provide an option as to whether the bucket is discharged at that particular point or not.

The cam follower surfaces which cause the buckets to empty may be provided by a series of pegs spaced around a sprocket and this may be followed by a second cam follower surface which cause the smooth return of the buckets to their "empty" positions.

BRIEF DESCRIPTION OF THE DRAWINGS

In the accompanying drawings:

FIG. 1 is an elevation of a bucket type elevator embodying the present invention;

FIG. 2a is a diagrammatic side elevation of a terminal or end discharge mechanism;

FIG. 2b is a diagrammatic end elevation of the same terminal or end discharge mechanism;

FIG. 3 shows the discharge mechanism located somewhere along the horizontal portion of the bucket elevator;

FIG. 4 shows a cam surface movable into and out of the path of the buckets along a horizontal section of the bucket elevator;

FIG. 5 shows an elevation of a bucket illustrating the sector shaped cam attached to each bucket;

DETAILED DESCRIPTION OF THE INVENTION

Figure 6:
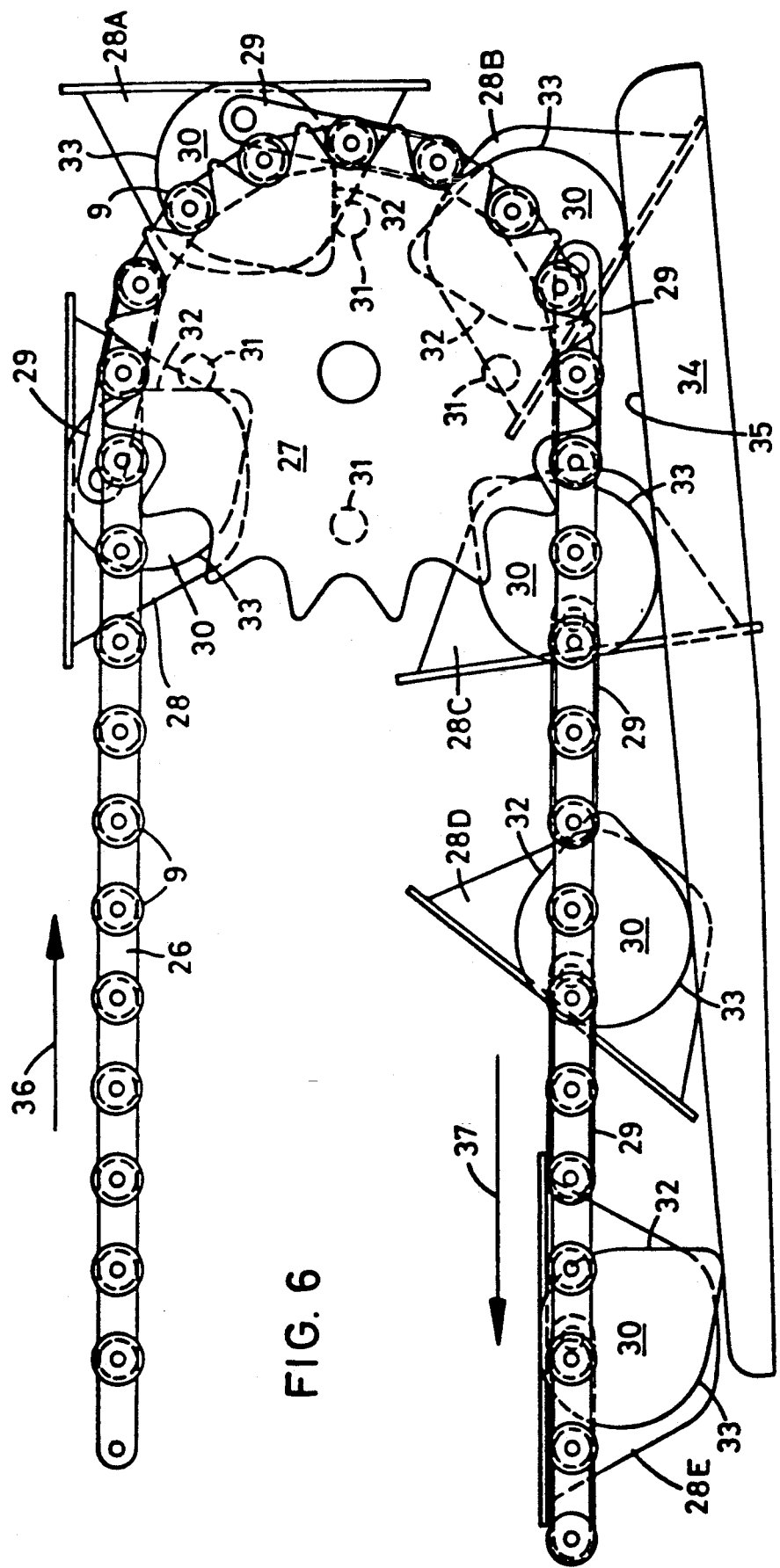
FIG. 6 is a side elevation of the end portion only of swing-link bucket conveyor embodying the present invention and illustrates an alternative method of end discharge.

The bucket elevator may be generally of the kind as shown and described in detail in U.S. Pat. No. 4722433 or European Patent Application 0212858A in which swinging links are used to attach the buckets to the chain. Alternatively the buckets may be supported from the chain by fixed arms attached to the links of the chain, the buckets being suspended pivotally on the ends of the arms.

In FIG. 1 a bucket elevator 10 comprises a continuous chain 11 to which are pivoted a series of buckets 12. The chain passes over sprockets 13 in the normal way, the chain carrying pairs of wheels 9 (FIG. 5) which engage between the sprocket teeth.

The buckets may be arranged to empty at the upper end as they go round sprocket 13A (FIGS. 2a and 2b). Alternatively they may be arranged to empty at some intermediate point along the horizontal section 20 of the bucket elevator as illustrated in FIGS. 3 and 4.

Each bucket 12 carries a sector shaped cam 15 (FIGS. 2 and 5). Each cam 15 has a straight cam surface 17 followed by a French curve 16 on i.e. a curve of gradually increasing radius. As seen in FIG. 5 the curve 16 progressively increases in radius about the bucket trunnion from left to right.

The tipping mechanism is applied to a 135° partial bucket tipping attitude, as shown in FIGS. 1 to 4.

As the buckets approach the terminal sprockets 13A they move around the longer radius, staying in a perpendicular attitude until such time as the bucket cam face 17 comes into contact with circular rotational cam 13B fastened to sprocket 13A or the terminal shaft 21. As it progresses in a clockwise movement the cam 15 is made to pivot and turn the bucket to a point where the contents of the bucket are discharged. The curved cam surface 16 now comes into contact with cam follower surface 22. This continuous contact between cam 16 and cam follower surface 22 ensures that the buckets are prevented from any forward roll. Forward roll must be avoided because the Kinetic energy causes the bucket to spin and collide with the preceeding bucket. The cam 16 and cam follower 22 prevent this. The mechanism in FIG. 2 is for single end discharge arrangements at up to 75 to 100 feet per minute.

In FIG. 3 a similar cam follower 23 is moved into the path of the buckets by selective means, which enables hoppers or chutes to be fed by remote selection that causes the bucket to dislodge its contents at high speed with both a "Dwell" time while the product "falls free" held in the inverted position, and yet by means of the progressive radiused cam it is prevented from continued spinning and bucket collisions. In FIG. 3 the cam follower 23 has a discharge cam follower surface 23A and a stabilising cam follower surface 23B.

FIG. 4 shows the same mechanism with the cams 15a on the buckets inverted and mounted below the bucket pivots (not above). Cam 25a is inverted and, when offered to the bucket path, causes the bucket to tip forward (anti-clockwise) which is advantageous with some products that are of a wet or sticky nature.

This type of cam and follower enables buckets to be discharged at faster speeds because it has the ability to control the "after spin" or "overswing" of the buckets following the dumping sequences.

In FIGS. 6, 7, 8 and 9 an alternative form of end discharge arrangement for a bucket conveyor is shown. Only part of the conveyor is shown and clearly the conveyor might be at the end of a long extended horizontal conveyor or it might be for instance a horizontal arm of a vertical elevator type conveyor.

The usual conveyor chain 26 is illustrated and it is shown passing over a sprocket 27 which may or may not be a driven sprocket. The sprocket 27 may be one of a parallel pair.

A number of buckets are shown for purposes of illustration though clearly there would be buckets spaced all along the conveyor at regular intervals. Each of the buckets 28 is carried on a swing link 29, similar in principle but not in detail to the type illustrated in European Patent Application 86305643.8 or U.S. Pat. No. 4722433.

Fixed to each bucket is a cam 30. In this arrangement the cam follower 13B is not in the form of a continuous cam follower surface but is provided in the form of four pegs 31 which are fixed to the sprocket 27 around a circle.

Each peg 31 acts as a cam follower which actuates the straight section 32 of cam 30 to cause the tipping action of the buckets to enable them to discharge their loads. As the buckets proceed around the sprocket 27 successive buckets contact, as shown in FIG. 6, one of the pegs 31, which cause each bucket to effect a smooth tipping action as illustrated in the drawing.

The return of the buckets to their normal upright positions is effected by a lowering cam 34 located below the conveyor and having an extended cam follower surface 35 which is contacted by the curved portion 33 of cam 30 so as to smoothly and gently return the buckets to their normal position for loading.

It will be appreciated that the conveyor travels in the direction shown by the arrows 36 and 37.

Figure 7:
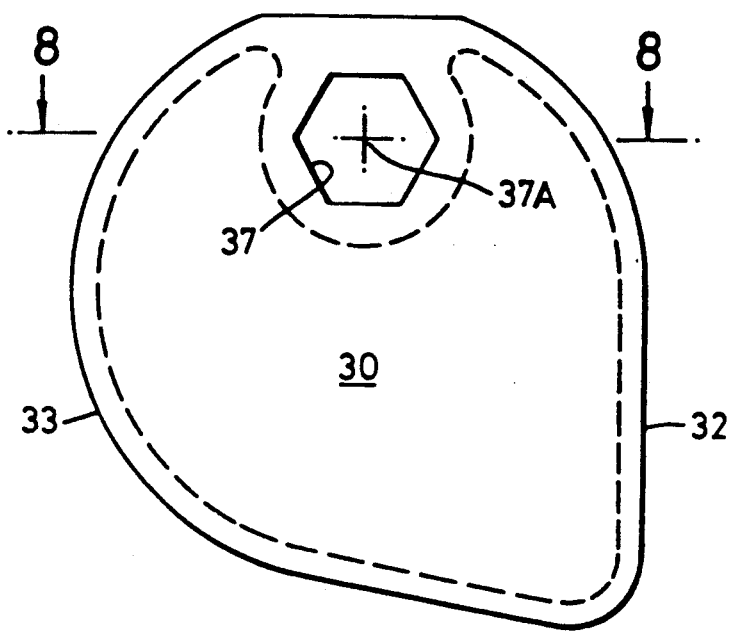
FIG. 7 is an elevation of a preferred form of cam used in the embodiment of FIG. 6.
Figure 8:
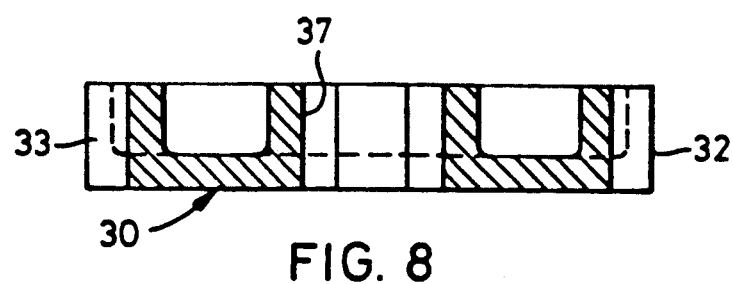
FIG. 8 is a section on line 8—8 shown in FIG. 7.
Figure 9:
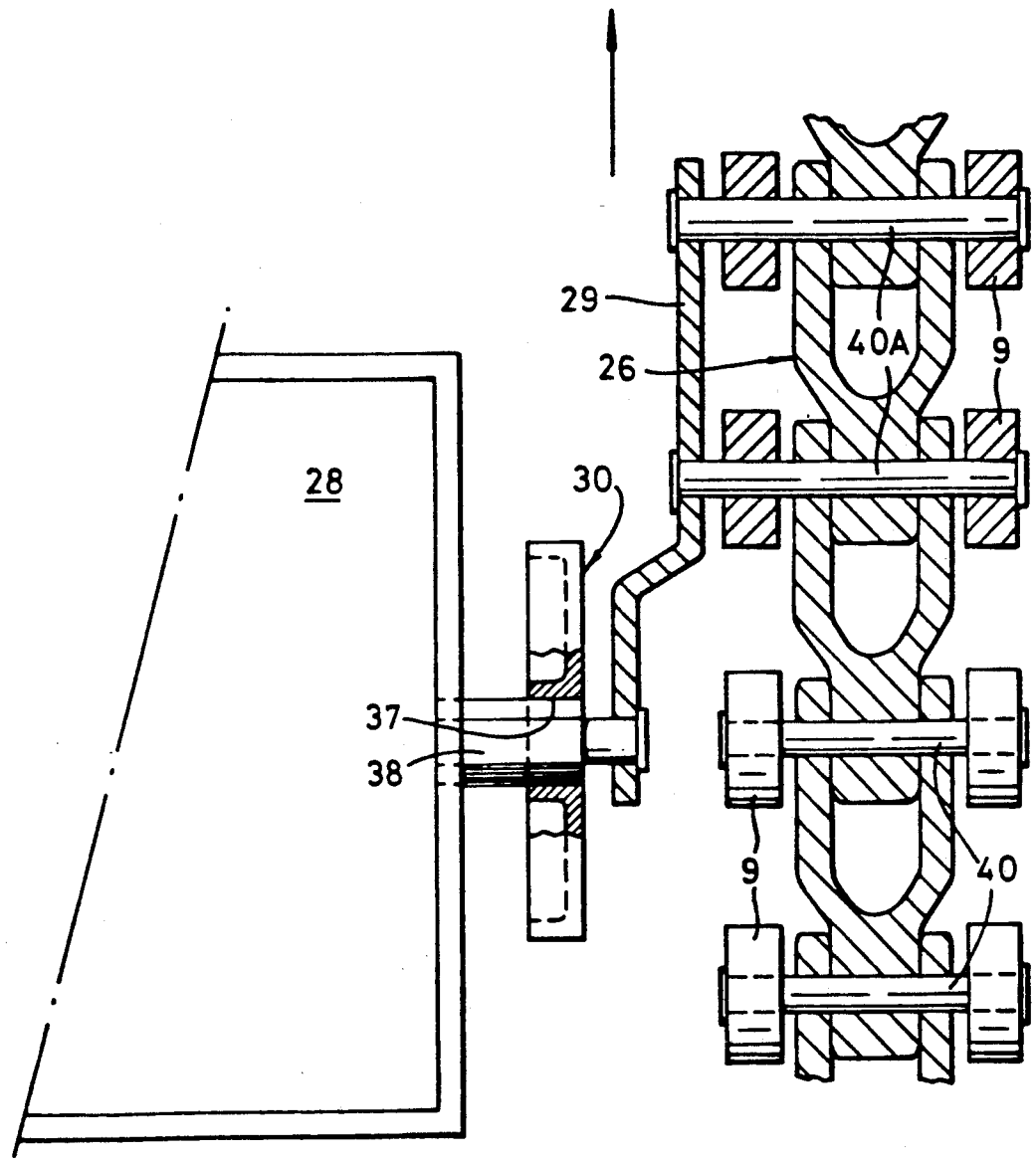
FIG. 9 is a section through the chain and swing link mechanism of FIG. 6.

The cam 30 is illustrated in FIGS. 7 and 8 in detail. It has a hexagonal bore 37 which fits over a corresponding shaft 38 (FIG. 9). The important surfaces of the cam are straight surface 32 and curved surface 33. The curved surface 33 is a "French curve" whose radius relative to the centre 37A of bore 37 is progressively increased in an anti-clockwise direction.

In use the straight surface 32 of the cam first comes into play when it hits one of the pegs 31 causing the bucket to tip substantially through a right-angle to the position shown at 28A in FIG. 6.

Then the portion 33 of the cam will contact the lowering cam surface 35 and from then on the movement of the cam and therefore the buckets is controlled by the cam surface running on the cam follower surface 35 as the bucket proceeds from right to left in FIG. 6. This causes the buckets to complete their tipping action and to continue turning smoothly and gently in the same direction until they reach their normal vertical position as illustrated by the successive positions of buckets 28B, C, D and E.

The way in which the camming mechanism of the present invention is integrated in a modified form with the swing link arrangement of European application 0212858A is shown in more detail in FIG. 9. The chain 26 is shown in section and it will be seen that the links of the chain are connected by link pins 40 which also carry the wheels 9. The buckets 28 are attached to the chain by swing links 29 carried by modified link pins 40A. Sprockets 27 are in parallel pairs to receive the corresponding pairs of wheels 9.

The swing links, carrying the cams 30 and the buckets 28 cause the buckets to swing outwardly, as shown in FIG. 6, as the buckets go around the sprocket. The outward swinging movement enables the buckets to be separated and thus avoids any problem of the buckets interfering with each other during this period.

The camming arrangement of this invention ensures that the buckets can be smoothly emptied and smoothly returned to their upright positions. Thus the combination of the swing link which moves the buckets outwardly and spaces them as they go round a curve and the camming arrangements, which ensure that the buckets return smoothly and gently to their normal positions without banging in to each other or interfering, leads to a very smooth operation and a very fast operation compared with existing conveyors and particularly existing elevator conveyors.

It will be noted also that by the time buckets have emptied they have returned to their horizontal position shown at 28E in FIG. 6 so that when the buckets start going downwardly, as illustrated in FIG. 1, they will be carried in the horizontal position. This is important because if the buckets are not horizontal any residual contents will be tipped downwardly and fall on the sprocket 13 and other mechanism at the bottom of the elevator.

In FIG. 3 an additional stationary cam 39 is shown below the buckets. The purpose of cam 39 is to prevent overswing of the buckets. A similar stationary cam 39a is shown in FIG. 4 and is used for the same purpose.

We claim:

1. A tipping mechanism for a bucket conveyor including a plurality of buckets, which tipping mechanism comprises:
   (a) a cam follower having a cam follower surface located adjacent the bucket conveyor;
   (b) a first cam attached to each bucket and having a cam surface including a progressive radius portion, the cam surface of said first cam on each bucket being arranged to cooperate with the cam follower surface of said cam follower and being shaped and arranged in relation to the cam follower surface so that in engagement therewith the bucket tips in response to the action of the first cam alone about a pivot point for discharge of its contents, the progressive radius portion of the cam surface and the cam follower surface cooperating to return the bucket to the non-tipped position in a smooth and progressive manner without spinning about the pivot point and without collision with an adjacent bucket; and (c) a second cam having a cam surface located adjacent the bucket conveyor and facing the cam follower surface, the cam surface on the first can on each bucket being shaped and arranged in relation to the cam surface on the second cam so that the two cam surface cooperate to limit the rotation of the bucket away from its non-tipped position caused by the engagement of the cam surface of said first cam with the cam follower surface of said cam follower.

2. A tipping mechanism according to claim 1 and in which the progressive radius portion of the cam surface on the first cam has a gradually increasing radius relative to the pivot point of the bucket.

3. A tipping mechanism according to claim 1 or claim 2 and in which the first cam is generally in the shape of a sector of a circle with a curved portion thereof defining the progressive radius portion thereof.

4. A tipping mechanism according to claim 3, wherein the cam surface on said first cam includes a straight portion and the cam follower surface includes first and second portions, and in which the first cam is mounted so that the straight portion thereof will contact the first portion of the cam follower surface to tip the bucket from a non-tipped position to a tipped discharge position, and the progressive portion of the cam surface on said first cam will contact the second portion of the cam follower surface to gradually return the bucket in a stable manner to its non-tipped position.

5. A tipping mechanism according to claim 1, and in which the cam follower surface is positioned either above or below the buckets.

6. A tipping mechanism according to claim 1, and in which at least one portion of the cam follower surface is movable into and out of engaging cooperation with the buckets and which tipping mechanism further includes deploying means for deploying said one portion of the cam follower surface into and out of engaging cooperation with the buckets.

7. A tipping mechanism according to claim 1 in which the cam follower surface of the cam follower defines an elongated wedge shape.

8. A tipping mechanism according to claim 1, comprising a sprocket around which a plurality of buckets travel, a chain for carrying the buckets, and a swinging link connecting each bucket to the chain, whereby, as the buckets travel around the sprocket, the swinging links cause separation of the buckets and prevent the buckets from colliding with each other.

* * * * *